(12) United States Patent
Kuo (10) Patent No.: US 8,480,111 B1
(45) Date of Patent: Jul. 9, 2013

(54) ENCLOSED MOTORCYCLE

(71) Applicant: Ming C. Kuo, Cerritos, CA (US)

(72) Inventor: Ming C. Kuo, Cerritos, CA (US)

( * ) Notice: Subject to any disclaimer, the term of this patent is extended or adjusted under 35 U.S.C. 154(b) by 0 days.

(21) Appl. No.: 13/694,163

(22) Filed: Nov. 2, 2012

(51) Int. Cl.
*B62H 1/00* (2006.01)

(52) U.S. Cl.
CPC ....................................... *B62H 1/00* (2013.01)
USPC ......................................................... 280/293

(58) Field of Classification Search
USPC .. 180/89.4, 89.12, 89.15, 209, 219; 280/43.2, 280/209, 220, 255, 288.4, 437, 499, 755, 280/756, 763.1, 767; 296/1.07, 24.3, 37.1, 296/70, 78.1, 96.11, 136.07, 146.1, 146.2, 296/146.3, 146.4, 180.5, 255
See application file for complete search history.

(56) References Cited

U.S. PATENT DOCUMENTS

| | | | | |
|---|---|---|---|---|
| 2,661,233 A * | 12/1953 | Sidel | | 296/64 |
| 3,700,059 A | 10/1972 | Sutton | | |
| 4,133,402 A | 1/1979 | Soo Hoo | | |
| 4,614,058 A * | 9/1986 | Boykin | | 49/56 |
| 5,029,894 A | 7/1991 | William | | |
| 5,181,740 A | 1/1993 | Horn | | |
| 5,401,055 A | 3/1995 | Pham | | |
| 5,685,388 A | 11/1997 | Bothwell et al. | | |
| 5,904,392 A | 5/1999 | Mainwal | | |
| 6,273,207 B1 * | 8/2001 | Brown | | 180/219 |
| 6,588,789 B1 | 7/2003 | Porcella | | |
| 6,637,763 B2 * | 10/2003 | Kuo | | 280/209 |
| 7,017,697 B2 * | 3/2006 | Yang | | 180/230 |
| 7,357,416 B2 * | 4/2008 | Wagner | | 280/764.1 |
| 8,002,067 B2 | 8/2011 | Nishiura et al. | | |
| 2007/0012500 A1 * | 1/2007 | Brown et al. | | 180/219 |
| 2010/0127847 A1 * | 5/2010 | Evans et al. | | 340/461 |

* cited by examiner

*Primary Examiner* — J. Allen Shriver, II
*Assistant Examiner* — Felicia L Brittman
(74) *Attorney, Agent, or Firm* — Gordon K. Anderson (57) ABSTRACT

An improved enclosed motorcycle (310) is taught, having an electric motor (324) and an improved handlebar assembly (326) employing a torque arm (358) with spherical rod ends (360). The foot brake pedal (328) is improved by attached rigidly to the frame (320) and the bench seat (330) is now slideably attached and the back portion of the bench seat capable of tilting providing the requisite adjustment. The landing wheels (332) are now individually mounted on a support arm (372) hinged on the frame retained by a spring loaded take-up rod assembly (374) allowing stabilizing on uneven surfaces. The entrance doors upper half windows each have vent window (386) hinged independently on a front edge with the hinge including a locking head (392) secured to the window frame for ventilation. The leg doors (340) are hinged horizontally onto the entrance doors (338) and open at a predetermined speed before the motorcycle has stopped.

17 Claims, 9 Drawing Sheets

ENCLOSED MOTORCYCLE

CROSS REFERENCE TO RELATED APPLICATION

This application claims priority of Provisional Patent Application Ser. No. 61/688,611 filed May 18, 2012.

TECHNICAL FIELD

The present invention relates to motorcycles in general. More specifically to improvements in a fully enclosed motorcycle having entrance and leg doors which utilize outrigger wheels and have the majority of features of a conventional passenger automobile.

BACKGROUND OF THE INVENTION

Previously, many different types of motorcycles have been used with most prior art including stabilizing outrigger wheels to eliminate the need for the driver to touch the road with his feet when stopped or moving very slowly. Enclosures have been employed to protect the motorcycle driver from the adverse environmental conditions.

A search of the prior art did not disclose any patents that possess the combined novelty of the instant invention; however the following U.S. patents are considered related:

| Pat. No. | Inventor | Issue Date |
| --- | --- | --- |
| 3,700,059 | Sutton | Oct. 24, 1972 |
| 4,133,402 | Soo Hoo | Jan. 9, 1979 |
| 5,029,894 | Willman | Jul. 9, 1991 |
| 5,181,740 | Horn | Jan. 26, 1993 |
| 5,401,055 | Pham | Mar. 28, 1995 |
| 5,685,388 | Bothwell et al. | Nov. 11, 1997 |
| 5,904,392 | Mainwal | May 18, 1999 |
| 6,588,789 B1 | Porcella | Jul. 9, 2003 |
| 6,637,763 B2 | Kuo | Oct. 28, 2003 |
| 8,002,067 B2 | Nishiura et al. | Aug. 23, 2011 |

U.S. Pat. No. 3,700,059 issued to Sutton is for a motor vehicle with tandem wheels and a pair of wheels on the longitudinal axis secured by struts. Coupling means synchronize the steering mechanism with the position of the side wheels and their retracted and extended position. A motor positions the wheels at the desired level.

Soo Hoo in U.S. Pat. No. 4,133,402 teaches a side wheel outrigger assembly for each side of a motorcycle that is mounted on an arm which in turn is pivotally connected to a mounting plate on the vehicle. A strut is fixed to the arm and extends for supporting the wheel mounted on the outward end. A hydraulic cylinder is connected to the arm with a conduit connected the interior of the cylinder allowing the piston to move within the cylinder during normal operation and absorb impacts encountered by the wheel. A valve interrupts the flow of fluid to the cylinder to prevent the wheel from moving relative to the mounting plate allowing the wheel assembly to become rigid. The side wheels fold up and in when not in use.

Willman in U.S. Pat. No. 5,029,894 discloses a conventional motorcycle with retractable stop support side wheels parallel with the rear wheel of the vehicle. The side wheels lock in place when down during stop and start driving and when parked. Hydraulic cylinders activate the struts on which the side wheels are pivotally positioned. Manual or automatic operation with selective speed up and down actuation is optionally taught.

U.S. Pat. No. 5,181,740 issued to Horn is for a vehicle with tandem wheels. Auxiliary road wheels are positioned on each side of the vehicle and are held by extending pivot arms which are lowered during low speed travel and when the vehicle is stationary. At the raised position the road wheels extend to ride on the roadbed when the vehicle is tilted sideward in an inclined position. The vehicle is in an inverted teardrop configuration tapering both in the front and rear. A spoiler flap on the rear is actuated concurrently with the vehicle brake system.

Pham in U.S. Pat. No. 5,401,055 teaches a center tracking motor vehicle and a body enclosing the occupants. The vehicle is stabilized at slow speeds by a pair of outrigger struts and retractable wheels mounted on both sides at its mid length. The outrigger struts and retractable wheels may be swing outward to increase the track when necessary in adverse weather or road conditions. The outriggers have the capability to lift the vehicle upright should it inadvertently fall flat on its side.

U.S. Pat. No. 5,685,388 of Bothwell et al. is for an enclosed motorcycle body having the lower portion open permitting the driver to engage the ground.

Porcella's U.S. Pat. No. 6,588,789 B1 discloses an adjustable support for bearing the weight of the driver's body and head while driving in and enclosed outer envelope.

Kuo in U.S. Pat. No. 6,637,763 B2 is my prior art patent to which the improvements herein are directed. The basic elements include a structural frame, a pair of tandem wheels, an engine, a handlebar assembly, a foot brake pedal, a bench seat, a pair of outrigger landing wheels, with automatic control to extend the wheels, and an enclosure including a pair of entrance doors each having upwardly hinged leg doors.

U.S. Pat. No. 8,002,067 B2 of Nishiura et al. disclose an electric motorcycle including a battery, a power drive unit and a driving power generating motor in a forward or reverse direction.

For background purposes and as indicative of the art to which the invention is related reference may be made to the remaining cited patents issued to Mainwal in U.S. Pat. No. 5,904,392.

BRIEF SUMMARY OF THE INVENTION

In this country automobiles are the most prevalent form of individual over the road conveyance and driving cars to work is a daily routine for most people congesting streets and highways. Furthermore vehicles of this type are historically driven by a single person because of the diverse location of the industry and business making carpooling difficult and not a viable alternative solution. It is therefore a primary object of the invention to utilize an efficient motorcycle that encloses the driver's body protecting it from wind and traffic noise and does not require physically touching the ground by the driver when stopped. The greatest advantage to this invention is that the driver is positioned inside the vehicle with basically all of the conveniences of an automobile on a smaller scale.

The enclosed motorcycle with its narrow width would permit two similar vehicles to travel side by side in one car lane on the busy highway or freeway reducing congestion and allowing vehicles to operate at higher speeds with better fuel economy particularly on crowded freeways.

If there were an abundance of enclosed motorcycles an additional quarter smaller width lane could be added by the government functioning as two motorcycle lanes. This additional lane would encourage two motorcycles to travel side by side permitting each motorcycle to maintain a safe distance from each other. In conventional parking lots the space may be used to a better advantage and the amount of time saved in traffic, energy saving and initial cost differential, are indeed beneficial to the entire world.

It is the primary object of the invention is to improve the prior art while still retaining the basic features of my original invention.

The internal combustion engine has been replaced with an electric motor coupled with a gear box. The rear wheel will still be driven with a chain, however the electric motor may be mounted inside the rear wheel for direct driving thus reducing the wheelbase distance and hence the length of the motorcycle. The motor incorporates a regenerative braking system saving energy and a slow reverse drive with a fuel cell or a battery pack which is preferred as the power source for the entire motorcycle.

The handlebar assembly has been improved as the previous prior art used U-joints to mimic an automobile which is less efficient and requires more efforts to steer the motorcycle. The improvements employ a torque arm assembly for front wheel steering allowing the driver to be as comfortable as in an automobile. In the torque arm assembly an arm attaches to the steering shaft and another to the steering bar shaft. The ends of both arms are connected by a connecting rod with spherical rod ends. The ends of the connecting rod of the assembly incorporate spherical rod ends which take up angular misalignment during steering. By utilizing a sorter arm for the steering bar shaft provides a simple way to achieve torque reduction where a conventional motorcycle does not have that ability. Because of the torque reduction a shorter steering bar is used in the relatively narrow cabin. This shorter steering bar requires a driver to steer more to get the desired angle on the front wheel making it not as agile, however the intended use of the invention is for cruising, commuting and shopping where the agility is not an important factor.

The elevation of the steering bar may be fixed in position or adjustable. In the fixed position, the steering shaft assembly consists of a steering bar, a steering shaft securing a torque arm. The steering bar mounts on the head of the steering shaft. The torque arm mounts against a collar on the steering shaft. The lower half of the shaft mates with a stationary bearing and holds in place axially by the collar and a threaded nut placed at the bottom of the shaft.

The adjustable steering shaft assembly consists mainly of a steering bar, a steering shaft, a torque arm sleeve which secures the steering torque, and a weight compensating spring. The steering bar mounts on the head of the steering shaft. The shaft has a keyway along its length and a series of holes at an opposite side. The arm sleeve mounts a key engaging with the keyway on the steering shaft and at its opposite side a spring-loaded pin engages one of the series of holes on the shaft. By pulling the pin away, the steering bar may be relocated in a different location. The lower half of the sleeve is supported by a stationary bearing. A weight compensating spring rests its bottom in a housing which mounts on the bottom of the sleeve by thread engagement below the stationary bearing. The top of the spring bears against the steering shaft to compensate the weight of the entire steering shaft. The spring force minimizes the effort to adjust the height of the steering bar. The upper face of the spring housing works a thrust washer for the sleeve inside. The spring housing, along its centerline, has a spring guide to prevent the spring from buckling. The spring rate is low such that it would adequately compensate the steering shaft assembly for height adjustment.

The foot brake pedal and bench seat are improved by attaching the foot brake pedal to the frame in a fixed position and the bench seat slideably attached onto the frame permitting forward and aft movement along with the back portion of the bench seat tilting.

The drivers seat in the previous prior art patent is in a fixed location, which makes the position adjustments for steering bar and foot brake difficult which is required to suit each individual driver. The improved use of a slidable seat similar to the driver seat in an automobile and a fixed position for the foot brake pedal provides not only the requisite regulation but the same comfort as in an automobile. The adjustments to the seat may be either manual or with electrical power.

When motorcycle slows down to stop, its landing wheels automatically land on the road surface at a preset speed to hold it upright. When the motorcycle moves from a stop, its landing wheels retract at a preset speed. The driver does not need to stretch his or her feet out during stop and go allowing the motorcycle to drive like an automobile. There are two landing wheel assemblies, one on each side of the motorcycle. The position of landing wheels in the landed position are in the area where is closely under the center of gravity of the motorcycle.

Each landing wheel assembly mounts on a support arm which hinges at its lower end on a bracket secured to one end of a structural cylinder held in place by a spring-loaded take-up rod assembly. The introduction of the support arm and the take-up rod is the new improvement over the previous prior art. The landing wheel assembly consist of a worm gear drive with a screw type output shaft, a nut which engages with the screw shaft, a fork arm with its fork engaging with the nut using two stub pins and its middle part hinging on the support arm. A pair of connecting links with their upper end connect to each side of the lower end of the fork arm; a wheel leg has its upper end hinging on the supporting arm and its middle part connecting to the lower ends of the connecting links, with a landing wheel installed on the lower end of the wheel leg. When the gear screw shaft rotates, it drives the nut rotating the fork arm. The rotation of the fork moves the links to rotate the wheel leg causing the landing wheel to move up or down. The drive screw hits stops, when the landing wheels are at the landing and retracted positions. In the landing position, two pin joints of the links and the middle hinge of the fork arm are in line such that any impact from road surfaces to the landing wheels is transmitted directly to the support arm through the middle joint of the fork arm. The worm gear drive does not receive any, or very little, impact to avoid premature failures. A motor attaches the worm gear of one the landing wheel and the distal end of the motor's shaft connects to the other landing wheel assembly with a flexible shaft therefore the motor drives both landing wheels simultaneously.

The take-up rod assembly consists of a take-up rod, a compression spring, a spherical rod, and a pair of lock nuts. The rod's head is a transverse bar with a through round hole engaging with a pin hinging on the support arm and the rod's tail end places through the head of the spherical rod. The distal end of the rod is threaded and is locked with the nuts. The compression spring has seats on both ends and is placed between the rod's head and the spherical rod, preloaded by the lock nuts ensuring smooth and stable riding and parking of the motorcycle. The nuts provide adjustment of the landing wheels. The threaded rod end of the spherical rod secures to the body frame holding the supporting arm in place. The spherical rod end provides angular misalignments and end thrust capacities for reacting to the landing wheels' motions.

When the motorcycle stops on an area where its landing wheels land on a spot higher than the plane both front and rear wheels land on, the take-up rods on both sides will retract allowing their support arms to rotate raising both landing wheels up to reduce their loads. The same will happen if the driver is heavy, or carries extra cargo or passengers, causing both front and rear wheels to deflect more than what the landing wheels are set for. On the contrary, when the motorcycle stops at a lower spot for both landing wheels to touch the ground simultaneously, the motorcycle will tilt to one side until one of the landing wheels touches ground but it does not effect driving as long as the tilting is not too severe. If the motorcycle tilts too much, the motorcycle should be moved slowly until it reaches an area which is safe to drive on. Or it could drive backward slowly and then forward, if it is safer. There is a stop mounted on the body frame to prevent the support arm from over deflecting.

Two driving modes are provided permitting the driver to select the most appropriate one. On a paved road surface the driver may activate the landing wheel mode wherein the landing wheels function automatically and the driver does not need to stretch his or her feet out during a stop the motorcycle drives like a car. On this mode, the leg doors are always idle. When landing wheels are going up or down, a green light on dashboard flashes which stays on when landing wheels are completely down and turns off when they are fully retracted. The action of the green light assures driver that landing wheels are functioning.

When road conditions are bad enough to not use the landing wheels, the driver would select the leg door mode where the landing wheels are always in the retracted position. When the motorcycle is coming to stop, the leg doors on both sides will open automatically as it slows to a preset speed before stopping allowing the driver to stretch his or her feet out to hold the motorcycle in the upright position. The dashboard provides signals, including audio, indicating when the leg doors are open, the signals turn on urging the driver to touch the ground. Basically the motorcycle drives like a conventional motorcycle however, when the motorcycle moves from stop, the driver would close the leg doors manually by pressing a power switch. This gives the driver a better control on when it is safe to close the leg doors. The preset speeds for landing wheel mode and leg door mode are not required to be the same.

Sensors are installed detecting the landing wheels' motion and position. When the landing wheels fail to land, either just one wheel or both, during stopping the sensors activate the leg doors to open, turn on warning signals to urge driver to stretch feet out, and extend lower skid posts out. If the leg doors are open, but driver fails to touch the ground in time to hold the motorcycle, it will tilt to one side however, the lower skid post on the tilting side will touch ground first to prevent the motorcycle from tipping over. Similarly, if there is a total failure in electric system, disabling the landing wheels and leg doors to function automatically, an indicator on the dashboard will be on urging the driver to pull an emergency lever that activates the lower skid posts causing them to pop out, an indicator is mounted directly above the lever. When the motorcycle remains in the slow reversing drive, the landing wheels are in the landing position.

The entrance doors are completely different in the structure and function of the prior art patent in which the improvements are made. There are two entrance doors, one on each side of the motorcycle. Their design is similar to conventional passenger automobiles. Each door has a vertical front hinge and is opened by hand. A door handle is operable both outside and inside. However, each outside handle may be locked from outside only. Since the door is not locked from inside the driver may be rescued from outside in case of an accident.

Differing in size from the prior art, the door it is much larger and hinges from the front instead of the rear providing not only easy access, but also it accommodates a leg door.

The upper half of each entrance door contains a stationary window. For safety and to save weight, the window is made of clear plastic with abrasive resistant coating. On its leading side a small vent window is provided. This vent window hinges on its front edge and the lower end of the hinge has a locking head which includes triangular teeth which engage with mating teeth formed on a circular sector which is secured to window frame. The locking head connects to a spring-loaded handle. By pulling the handle on the head the teeth disengage allowing the window to swing inward and lock at the desired amount of opening.

The entrance door's fixed window contains a round vocal port having a clear cover hinging from the bottom and a spring-loaded wedge latch on the top. When the latch is released the cover swings down to clear the port which allows the driver to vocally communicate with the outside. The wedge latch will lock the cover in place. The circumferential surface of the cover has a conical taper with a smaller diameter on its outside surface. A circumferential seal is placed in a groove cut in the tapered surface.

The leg doors are improved since each leg door occupies the majority of the lower half of each entrance door allowing the driver to have ample room to extend his or her foot out to touch the ground. Each leg door has its top edge hinged horizontally on its mating entrance door, and is opened and closed with a motorized drive. The leg door, in the closed position, permits the side edges to mate with the entrance door and its bottom edge mates with body frame. The leg door motorized drive consists of a worm gear with a screw type output shaft, a cylindrical shape connecting rod and a compression spring. The upper end of the motorized drive hinges on the entrance door and the lower end of the rod hinges on the leg door. The upper end of the rod is formed as a female nut which is engaged with the motorized screw shaft. A spring placed between the motor housing and the rod's head smooth out their operation. When the screw rotates, it extends or retracts the rod to accomplish the open-close motion of the leg door. The end of the output shaft has a stop limiting the opening of the leg door.

There are three skid posts on each side of the motorcycle. One is located near the front end of the motorcycle and another near the rear end. Both are positioned high above the center of gravity of motorcycle. Third one is a lower skid post is mounted in the area under the center of gravity. All skid posts on each side of the motorcycle protrude with equal amount beyond its body width so that when it skids sidewise on road surface, the skid posts only touch ground to avoid the motorcycle's body from damaging. The head of the front skid post is made of hard materials and has a shape creating friction against road surface during skidding. The heads of the other two are cup shape with smooth surfaces to reduce friction. All three skid heads have a shock-absorbing body such as impact rubber and each secures into a retaining housing individually on the motorcycle's frame.

During skidding, the front skip post will create more friction force by design than the other two the momentum of the motorcycle will force its rear end to turn forward with its front end trailing behind. Hopefully, the motorcycle will skid to stop without hitting an object. If it does hit an object, the impact to the driver will be from the rear end however the driver will be protected by the seat cushion and seatback. Because the front skid post is positioned higher than the center of gravity of the motorcycle, its body will turn during skidding in the direction toward its bottom instead of its top.

The robust frame on the bottom of the motorcycle should minimize injuries to the driver.

The lower skid post is designed not only for skid purposes, but also as an outrigger to prevent the motorcycle from tipping over whenever there is a malfunction in landing wheels and leg doors systems. Under these conditions, the lower skid posts will extend out automatically. Each lower skid post is installed in one side of the structural cylinder against a compression spring and is held in position by a spring-loaded plunger which is either activated by a push-pull solenoid or by hand through a remote cable. After the lower skid posts are extended out, they may be reset by simply pushing them back until they are locked.

A structural cylinder having a guide collar with a smaller hole is attached with screws on its ends and a bulkhead at its middle divide the cylinder into two halves, one half for each of the left and right skid posts. The main body of each lower skid post is a cylindrical post tube with a collar mounted on its inner end. A skid head is mounted in the tube at its outer end and a stop collar mounted on the post tube to limit the travel of the skid post. The body of the skid head is round and made of impact rubber or similar material. The head's outer end caps with a hard metal cup with its inner end have a mounting screw at its center for securing the skid head to a bulkhead in the post tube. The metal cup protrudes beyond the end of the post tube and a compression spring places in the post tube from its inner end against a bulkhead in the post tube and the other end of the spring rests on the partition bulkhead in the structural cylinder. The post tube is a sliding fit with the guide collar's hole and the post collar is also a sliding fit with the inside face of the structural cylinder. The materials used for both guide collar and post collar have a high coefficient of friction to avoid the lower skid post from retracting as it touches ground. Aluminum could be one of good choices. The end of the post collar has a conical taper which engages a mating taper at the end of the spring-loaded plunger. When the post tube slides in from outside against the post spring, the post collar forces the plunger to retract and when the collar passes, the plunger will move back in to lock the post tube in place.

A push-pull solenoid is mounted in the middle of the main frame in line with the partition bulkhead in the structural cylinder. One of the solenoid's actuating ends mounts onto a plunger seat which has two guiding holes, each holding one of the plungers for the lower skid posts. The other actuating end of the solenoid mounts a cable to be actuated by hand remotely. Each plunger has a head with a protruded round end which works as a stop to limit the stroke of the solenoid and also as a spring seat. The plunger's body is either square or rectangular in cross section and at its distal end one of the flat faces is tapered toward the opposite face. Each plunger extends through one of the plunger seat's holes and an in-line hole on the structural cylinder's wall and its distal end reaches the flange face of the post collar. The flat face on the plunger opposite to the taper face rests against the flange face of the post collar holding the skid post in place under the force of the post spring. A compression spring rests on the plunger's head that forces it against the plunger seat and the other end of the spring rests on a stationary seat.

If there is a malfunction in landing wheels, the sensors on the system will activate the leg doors to open and the push-pull solenoid to pull the two plungers away from the two skid posts. That action allows the post springs to push the skid posts outward until the stop collar on each post collides with the guide collar on each end of the structural cylinder. If the motorcycle tilts, the post on the tilting side will touch ground to prevent the motorcycle from tipping over. While the lower skid post touches ground and the leg doors are open, it must provide enough ground clearance for the leg door on the tilting side so that it will not pinch the drivers' foot. In case of a total failure in electric system, disabling the landing wheels and leg doors to function automatically, an indicator on the dashboard will urge the driver to pull an emergency handle that release the lower skid posts to prevent the motorcycle from tipping over. The indicator is located right above the handle. If the motorcycle comes to a sudden stop and the landing wheels do not react before it starts to tilt, the tilting angle sensor activates and extends the skid post.

As automotive air conditioning systems waste energy a new ventilation system has been developed as an improvement since the interior of the motorcycle is enclosed, a personalized system is presented that saves energy. An air conditioned jacket for driver with imbedded heating elements, same as used in the household electric blankets, with air ducts laid along side the heating elements for cooling. The heating elements keep the driver warm in cold weather the ducts circulate cooled air keeping the driver comfortable in hot weather. A small air condition power unit is mounted in the engine compartment to provide cooled air to the jacket. A water mist spraying directly on the driver's face and hands also creates reasonable cooling effect.

Since there is no air conditioning the motorcycle must rely on a blower system and ram air therefore in front of the windshield. The exterior panel has a slotted air-intake opening and a box-shape air pocket is installed below the opening. The bottom of the box is sloped and its lower side has water drain holes. On the opposite side away from the drain holes, the rear wall of the box connects a rectangular intake duct extending rearward. A screen is placed at the entrance end of the intake duct to prevent foreign objects from entering and one of the vertical walls of the duct has a gated opening which branches a duct leading to a blower. A gate in the duct hinges vertically at its rear end at the gated opening and is actuated by a remote lever through a cable. When the gate closes the branch duct, the air will rush in freely toward the cabin. When the gate swings to block the rear half of the intake duct, the inlet air will flow to the blower and the blower has distributing ducts at its exhaust end leading to the dashboard. A filter is placed in the blower's ducting and the gate lever may be set at any positions to partially open the intake duct.

The enclosure, at its rear wall, includes a sliding window, a solid gate and a screen opened fully or partially by a handle through a remote cable. When the motorcycle is moving, opening the window increases air ventilation.

To prevent the enclosure from heating up during hot sunny days a round vent hole with a cover is installed at the top of the enclosure. With the top vent hole, the entrance door's vent windows and the rear window all open, the cabin air will circulate ambient air from outside to keep it cool in hot weather. The top vent cover hinges at its underside near its edge on a diametric beam secured to an annular base swiveled on a mating part secured to the cabin top and restrained from moving up by stops. A jack screw connects to a pin in the cover under its center and the lower end of the screw engages with a hand knob. The bottom end the jackscrew is flanged, which functions as a stop when the cover is fully open. The knob has a protruded round stem pointing upward and a hole through its center and the upper part of the hole is threaded to engage the jackscrew. The lower part of the hole is larger to accommodate the jackscrew's flange. The stem of the knob mounts on the diametric beam at its center such that the knob is swivel, but is constrained to axially. A spring is placed against the cover and the diametric beam. The hinge's hole on the cover is slotted vertically that when the knob turns to raise the cover, the spring forces the cover to move upward away the opening's seal on the cabin top until it has a sufficient clearance for the cover to tilt freely. When the pin hits the lower end of the slot, the cover will start to tilt upward. The hole on the cover engaging with the pin on the top of the jackscrew is slotted horizontally to allow the cover to tilt without any binding. A driver can orient the cover by holding to the diametric beam to any desirable directions. The hole may be used as an extra vent hole to increase air flow when the motorcycle is moving.

An inflatable safety belt or harness adds to the improvements of the motorcycle to protect driver during an accident. The belt works similar to an air bag in an automobile utilizing an impact sensor which inflates when a signal is sent from the impact sensor at the time of a collision.

Other improvements include a power windshield wiper, interior rearview minors, a rearview camera, mounted at the rear end of the enclosure and its monitor mounting forward, an electronic screen monitor, a cell telephone, a music player and a radio.

The structural frame is improved by utilizing a metallic tubing frame welded at intersecting joints, a carbon fiber frame or a preformed sheet metal frame. Further the windows and windshield are constructed of heavy duty thermoplastic having an abrasive resisting coating. The exterior enclosure is streamlined to reduce wind drag with components made of carbon fiber to increase rigidity and reduce weight at the same time.

The passenger seat and cargo compartment are improved with the seat made in two halves, with the front half hinging on its front edge and the rear one on its rear edge with each base side edge having sliding slots and notches for individual spring-loaded locking bars to engage so the seats can be tilted up or down, and locked in place. Under the seat is a flexible weatherproof cargo compartment when tilting up the two halves of the seat cushion a cargo compartment is formed. The two half seat cushions do not have equal lengths, so that they can create an adequate height for grocery when erected.

These and other objects and advantages of the improvements to the previous invention will become apparent from the subsequent detailed description of the preferred embodiment and the appended claims taken in conjunction with the accompanying drawings.

DETAILED DESCRIPTION OF THE INVENTION

The best mode for carrying out the invention is presented in terms of a preferred embodiment. This preferred embodiment of a improved enclosed motorcycle 310 is shown in FIGS. 1 through 42 and is comprised of the following; a structural frame 320, a pair of tandem wheels 322, an motor 324, a handlebar assembly 326, a foot brake pedal assembly 328, a bench seat 330, a pair of electrically actuated outrigger landing wheels 332, automatic control to extend the wheels 334, an enclosure 336 including a pair of entrance doors 338 and a pair of leg doors 340.

Figure 7:
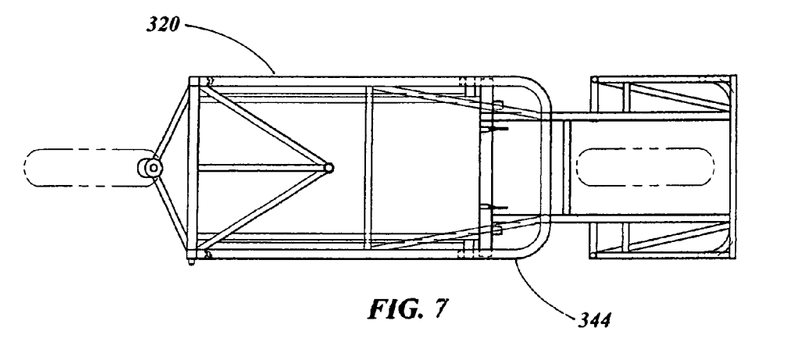
FIG. 7 is a top view of the improved enclosed motorcycle structural frame.
Figure 8:
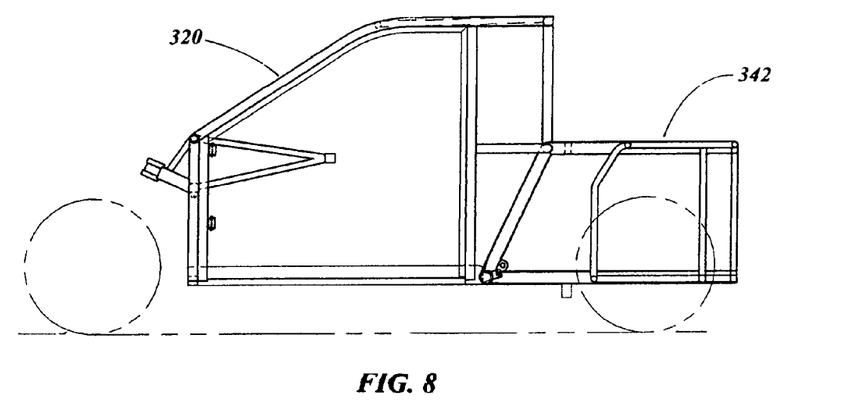
FIG. 8 is a side view of the improved enclosed motorcycle structural frame.
Figure 9:
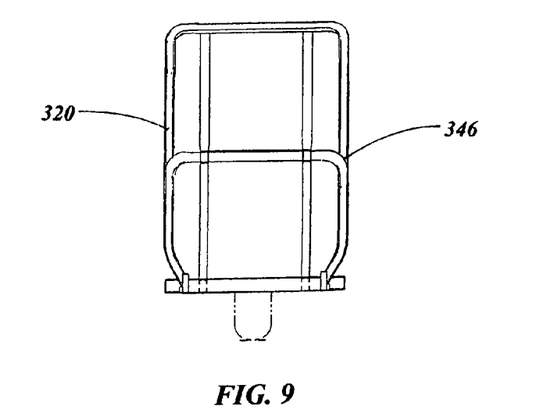
FIG. 9 is a rear view of the improved enclosed motorcycle structural frame.
Figure 10:
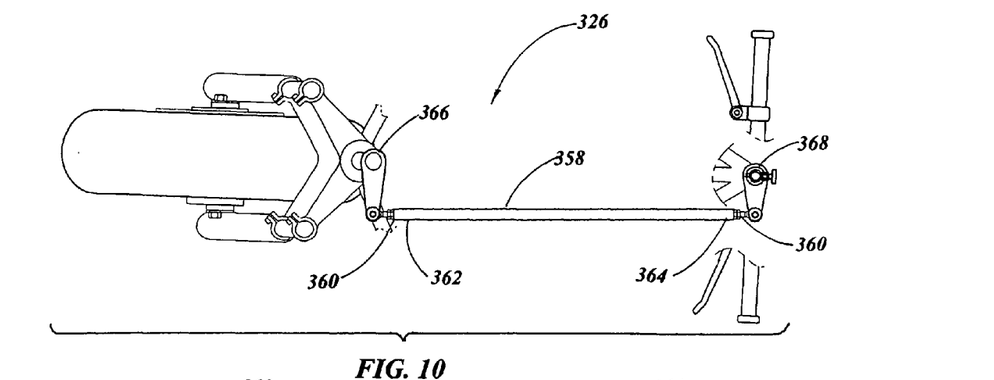
FIG. 10 is a partial top view of the handlebar torque arm assembly.
Figure 11:
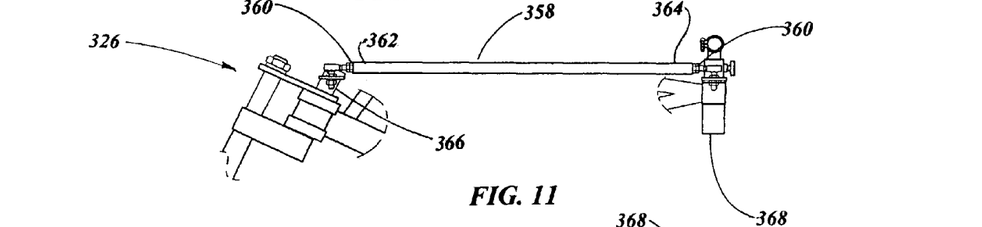
FIG. 11 is a partial side view of the handlebar torque arm assembly.
Figure 12:
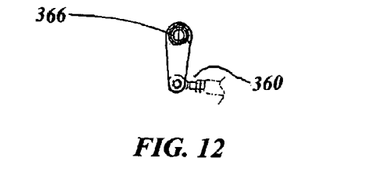
FIG. 12 is a partial top view of the first pivot arm of the handlebar torque arm assembly.
Figure 13:
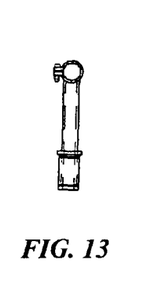
FIG. 13 is a side view of the fixed height handlebar assembly.
Figure 14:
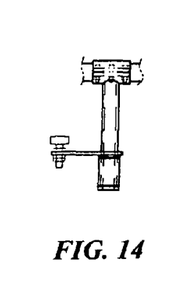
FIG. 14 is a partial rear view of the fixed height handlebar assembly.
Figure 15:
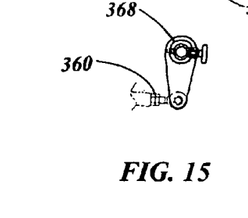
FIG. 15 is a partial top view of the second pivot arm of the handlebar torque arm assembly.

The structural frame 320 consists of a metallic tubing frame welded at intersecting joints 342, illustrated in FIG. 8, a carbon fiber frame 344, shown in FIG. 7 and a preformed sheet metal frame 346, depicted in FIG. 9.

Figure 2:
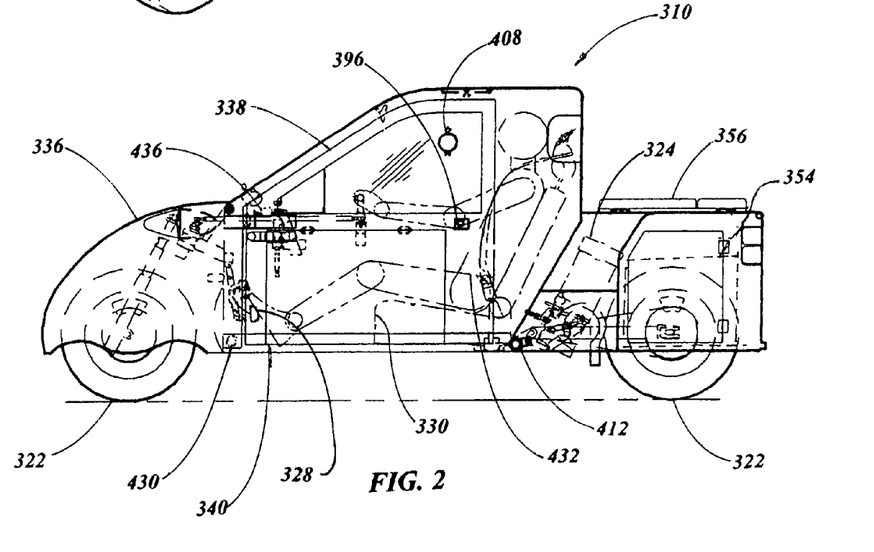
FIG. 2 is a side view of the improved enclosed motorcycle in the preferred embodiment.
Figure 3:
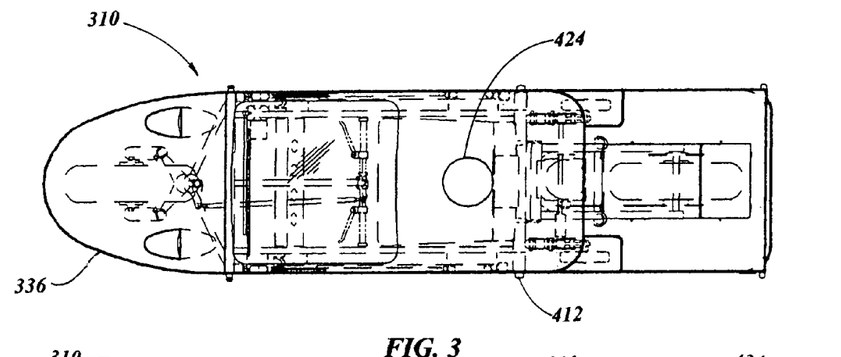
FIG. 3 is a top view of the improved enclosed motorcycle in the preferred embodiment.
Figure 4:
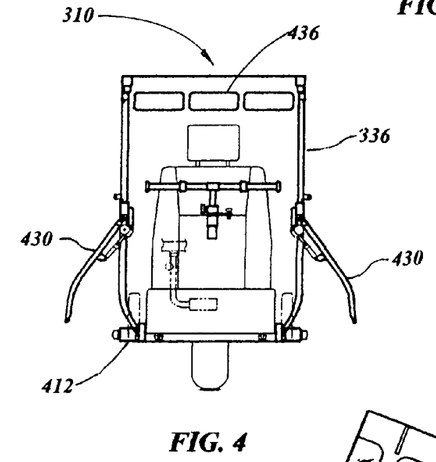
FIG. 4 is cross sectional view of the improved enclosed motorcycle with the leg doors in the open position in the preferred embodiment.
Figures 18, 19, 20, 21, 22, 23:
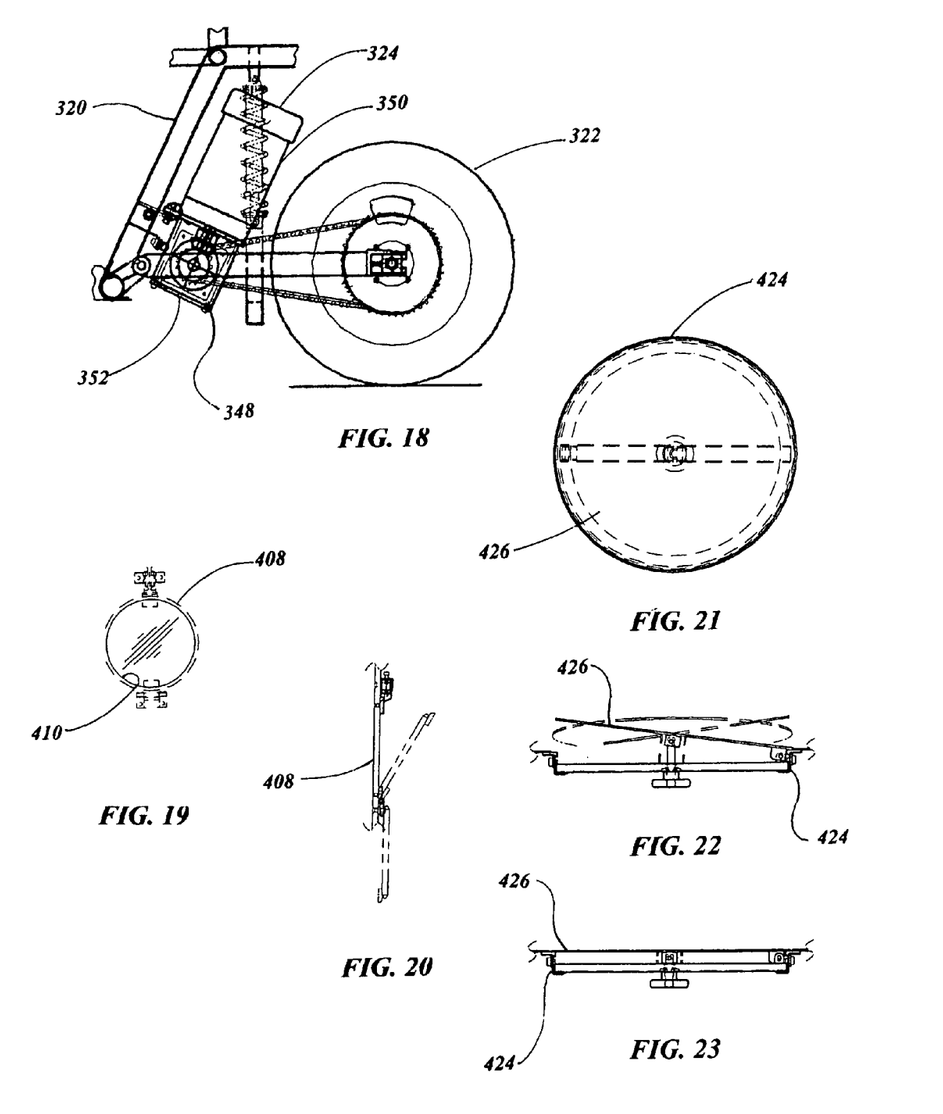
FIG. 18 is a partial side view of the rear wheel drive.
FIG. 19 is a side view of the round vocal port and cover.
FIG. 20 is a partial cross-sectional side view of the round vocal port and cover with the cover illustrated in dash lines in the open position.
FIG. 21 is a top view of the top vent and cover.
FIG. 22 is a side cross-sectional view of the top vent with the cover opened and two other opened positions in phantom lines.
FIG. 23 is a side cross-sectional view of the top vent with the cover closed.

The engine, disclosed in the prior art patent '763 as element 40, is defined in the dictionary as using energy to develop mechanical power, however it has been replaced with electric motor 324, which uses energy in the same manner only replaces fossil fuel with electricity. The motor 324 is coupled with a gear box 348, an integral regenerative braking 350 and an integral reduced speed reverse drive 352, as illustrated in FIGS. 2 and 18. A battery pack 354 supplies electrical power to the motor 324 and is located to beneath the passenger seat 356, shown in FIG. 2.

Figure 16:
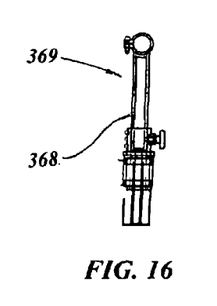
FIG. 16 is a side view of the adjustable height handlebar assembly.
Figure 17:
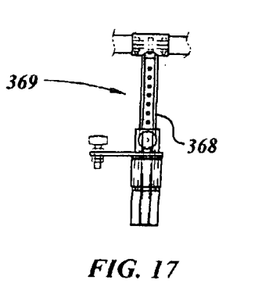
FIG. 17 is a partial front view of the adjustable height handlebar assembly.

The handlebar assembly disclosed in the prior art patent '763 as element 46 has been improved which now employs a torque arm 358 with spherical rod ends 360 with the torque arm 358 having a first end 362 and a second end 364 with the torque arm first end 362 connected to a steering shaft 366 and the torque arm second end 364 connected to a steering bar shaft 368. The handlebar assembly further comprises an adjustable height steering bar 369 as illustrated in FIGS. 16 and 17 and described in detail in the above Brief Summary of the Invention section.

The foot brake pedal 328 disclosed in the prior art patent '763 as elements 96 through 126 is attached to the structural frame 320 in a fixed position, as shown in FIG. 2 which is an improvement discussed in the above Brief Summary of the Invention section.

The improved bench seat 330 is slideably attached onto the structural frame 320 permits forward and aft movement and a back portion of the bench seat is capable of tilting.

Each of the improved landing wheels 370 mount on a support arm 372 which hinges on the structural frame 320 and is retained by a spring loaded take-up rod assembly 374 providing a smooth stable landing of the motorcycle 310 on uneven ground surfaces as illustrated in FIGS. 31-36. The spring loaded take-up rod assembly 374, depicted in FIGS. 32, 33 and 36, consist of a compression spring 376, a take-up adjustment rod 378 and a pair of lock nuts 380. At least one landing wheel sensor 382 detects the landing wheel's motion and position and a dashboard green light 384 flashes when the landing wheels 370 are moving and stays lit when extended.

Figure 1:
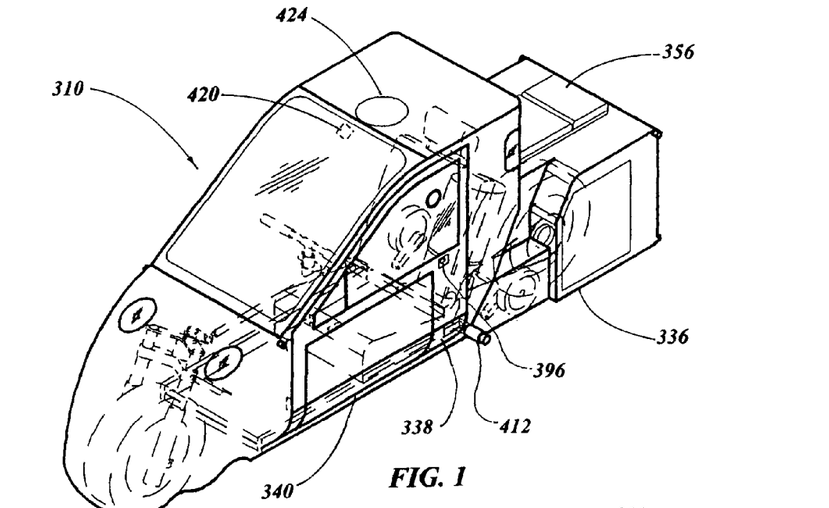
FIG. 1 is a partial isometric view of the improved enclosed motorcycle in the preferred embodiment.

Upper half windows of the entrance doors 338 each have a vent window 386, depicted in FIGS. 24, 26-28, which are pivoted on a hinge 388 attached to the door frame 390. The lower end of the hinge 388 includes a locking head 392 with triangular teeth engaging with mating teeth formed on a circular sector secured to a window frame 394. A door lock 396, shown in FIGS. 1 and 2, is provided on each door 338 operable only from the outside for rescue purposes.

Both leg doors 340 are improved since now each leg door 340 occupies the majority of the lower half of each entrance door 338 allowing the driver to have ample room to extend his or her foot out to touch the ground. Each leg door 340 is hinged horizontally onto each mating entrance door 338. The enclosed motorcycle 310 includes an electronic logic control unit 398 permitting the leg doors 340 to open at a predetermined speed before the motorcycle 310 has stopped allowing the driver to extend his/hers feet for stability.

Figures 24, 25:
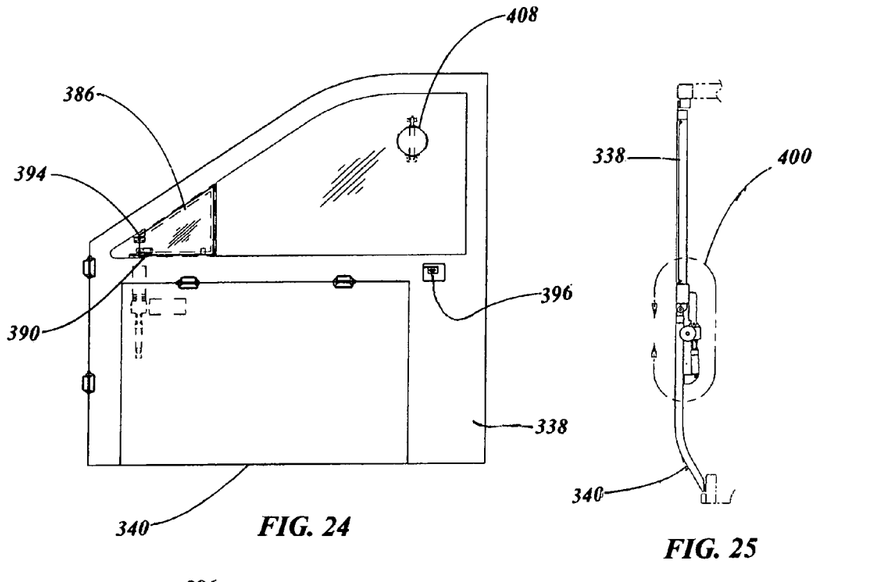
FIG. 24 is a side view of the entrance door.
FIG. 25 is a right end view of entrance door.
Figure 26:
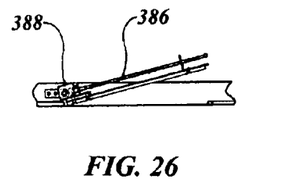
FIG. 26 is a top cross-sectional view of the vent window in an open position.
Figure 27:
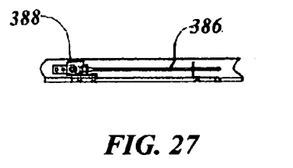
FIG. 27 is a cross-sectional view of the vent window in a closed position.
Figure 28:
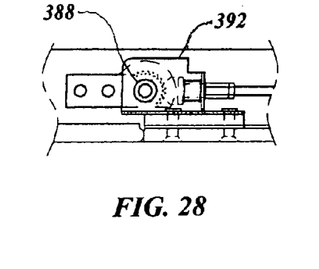
FIG. 28 is a partial top view of the vent window locking head.
Figure 29:
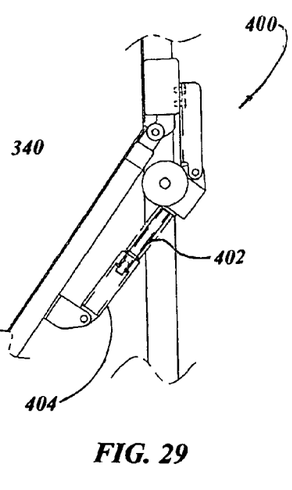
FIG. 29 is a partial rear view of the leg door actuator with the door opened.
Figure 30:
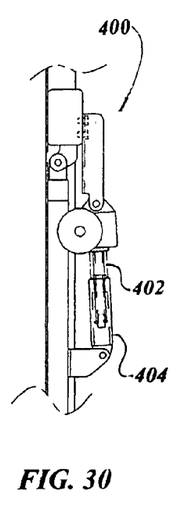
FIG. 30 is a partial rear view of the leg door actuator with the door closed.
Figure 31:
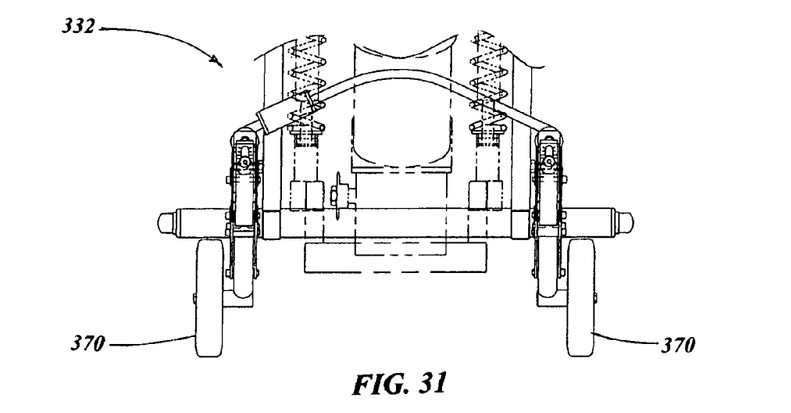
FIG. 31 is a rear view of the outrigger landing wheel assemblies.
Figures 32, 33, 34, 35, 36:
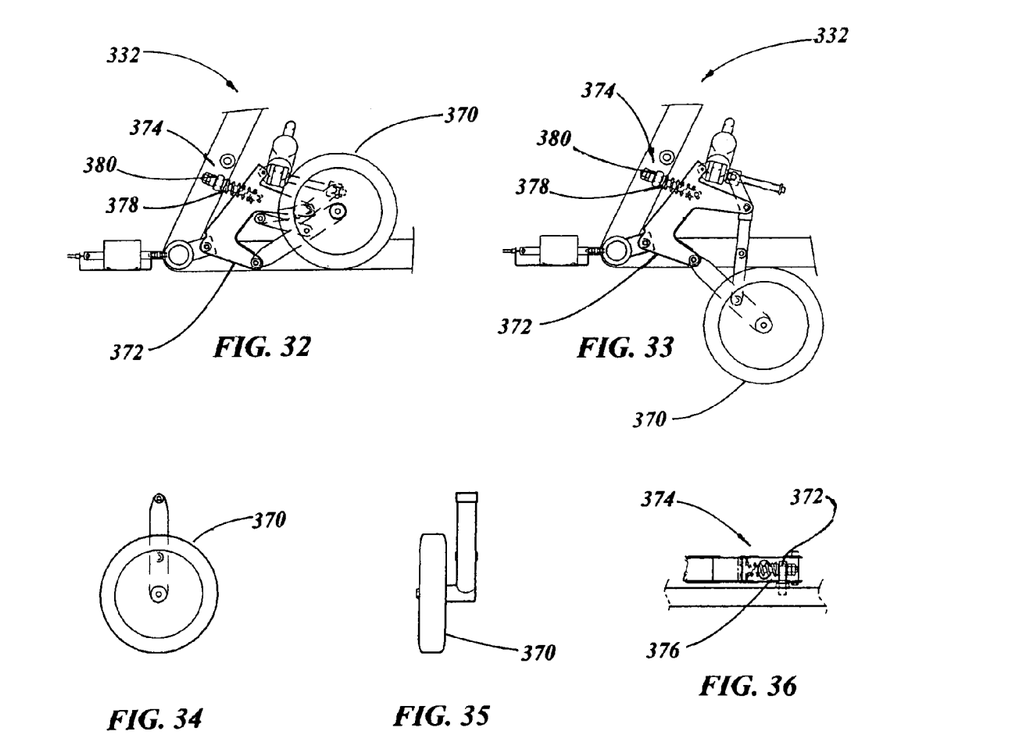
FIG. 32 is a partial side view of the outrigger landing wheel assembly in the retracted position.
FIG. 33 is a partial side view of the outrigger landing wheel assembly in the extended position.
FIG. 34 is a side view of one of the landing wheels and wheel leg.
FIG. 35 is an end view of one of the landing wheels and wheel leg.
FIG. 36 is a top view of the landing wheel take-up rod assembly.

The leg doors 340 open and close with a motorized drive 400, illustrated in FIGS. 25, 29 and 30, consist of a worm gear 402 having a screw type output shaft, a cylindrical shape connecting rod 404 and a compression spring 376. The upper end of the motorized drive 400 hinges on the entrance door 338 and the lower end of the connecting rod 404 hinges on the leg door 340. The upper end of the connecting rod 404 is formed as a female nut which is engaged with the screw shaft of the worm gear 402. A compression spring 376 is used for smooth operation. When the screw shaft of the worm gear 402 rotates, it extends or retracts the connecting 404 rod to accomplish the open-close motions of the leg door 340. A dashboard enunciator 406 emits a sound when the leg doors 340 are opening therefore alerting the driver.

The improvements include the following additions:

A round vocal port 408, illustrated in FIGS. 1, 2, 24, 19 and 20, is now included in the existing entrance door windows of the prior art patent '763 as elements 180 which include a hinged clear cover 410.

Figures 37, 38:
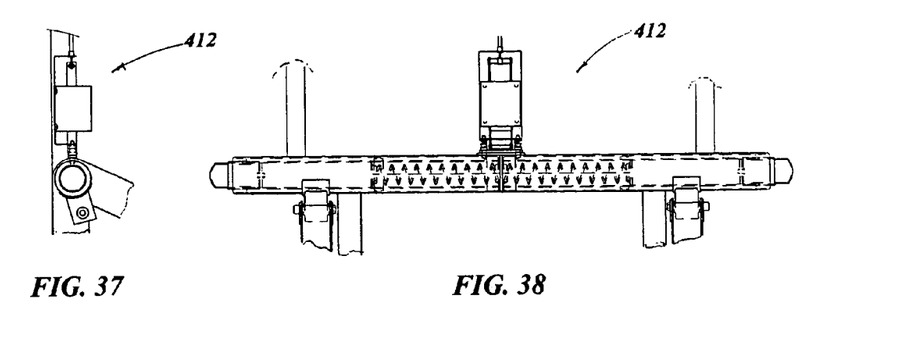
FIG. 37 is a partial side view of one of the skid posts.
FIG. 38 is a partial top view of the skid posts.
Figure 39:
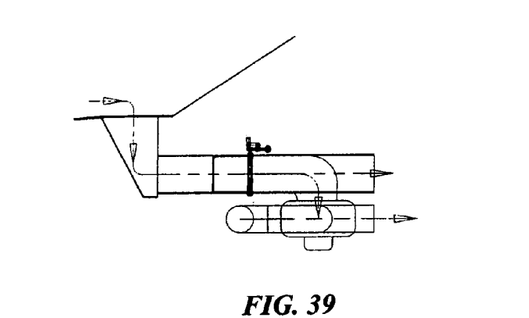
FIG. 39 is a side view of the dashboard ventilation system.
Figure 40:
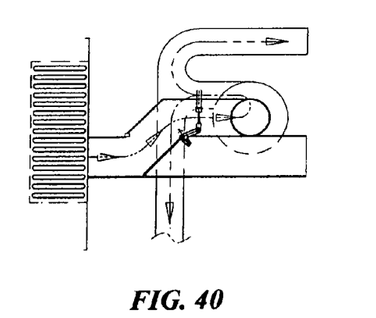
FIG. 40 is a top view of the dashboard ventilation system.

Pair of lower skid posts 412, shown in FIGS. 37 and 38, are positioned beneath the motorcycle frame 320 near and below the motorcycle's center of gravity.

Figure 41:
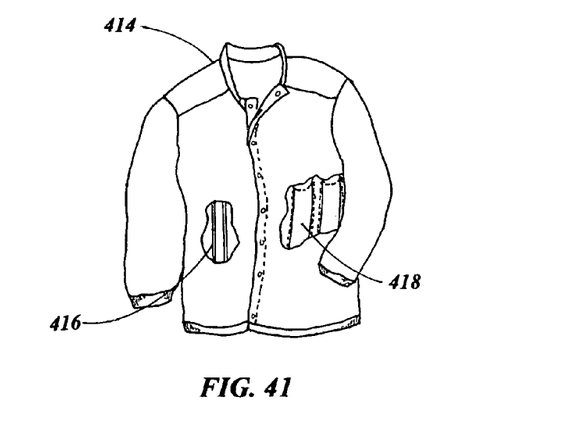
FIG. 41 is a front view of the air conditioned jacket.
Figure 42:
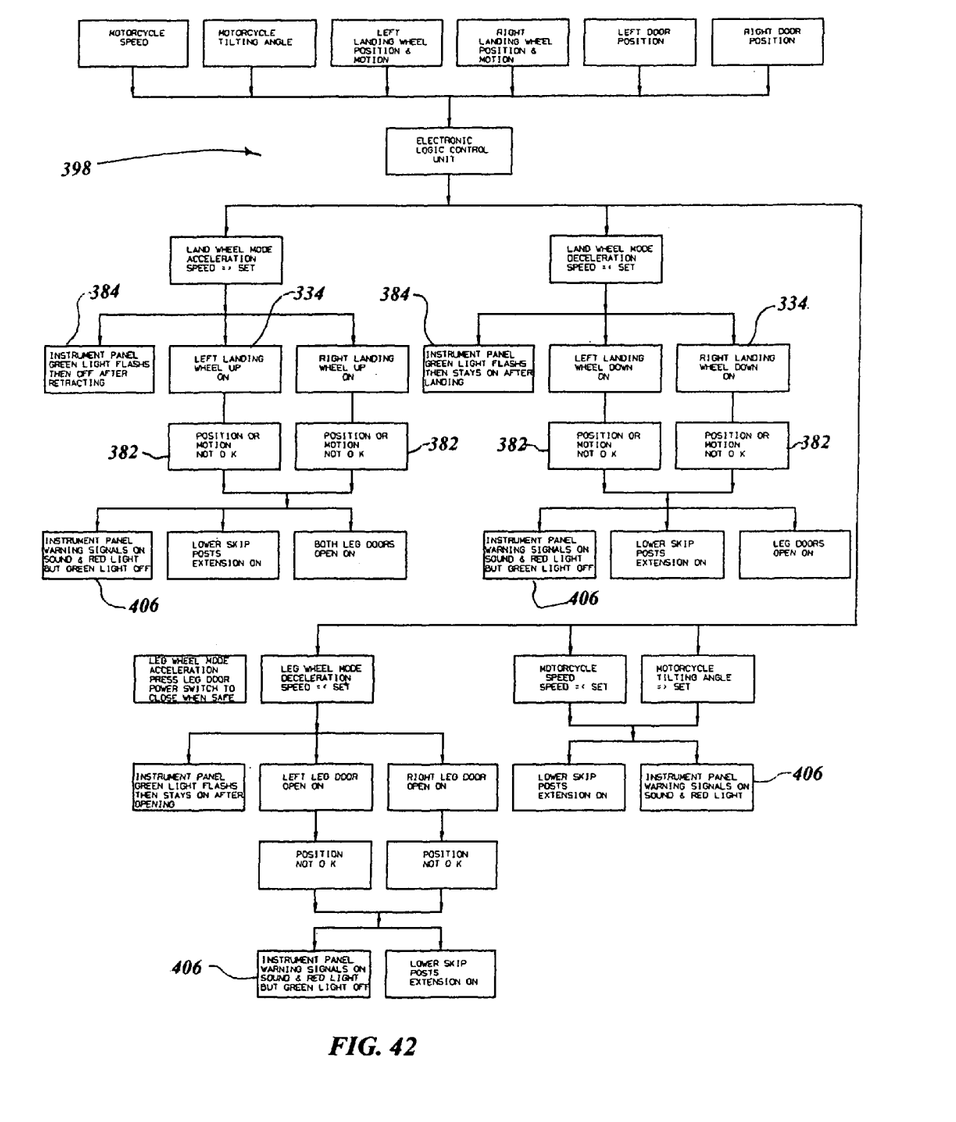
FIG. 42 is a block diagram of electronic logic control system.

An air condition jacket 414, depicted in FIG. 41, utilizes motorcycle electrical power, with the jacket 414 containing imbedded heating elements 416 and air ducts 418 along side of the heating elements for both heating and cooling.

A water mist spray 420, illustrated in FIG. 1, is directed into the drivers face and hands for evaporative cooling.

Figure 5:
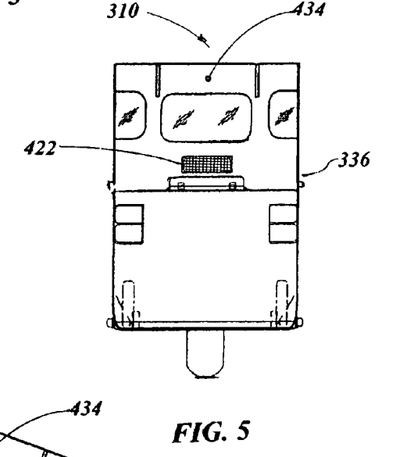
FIG. 5 is a rear view of the improved enclosed motorcycle in the preferred embodiment.
Figure 6:
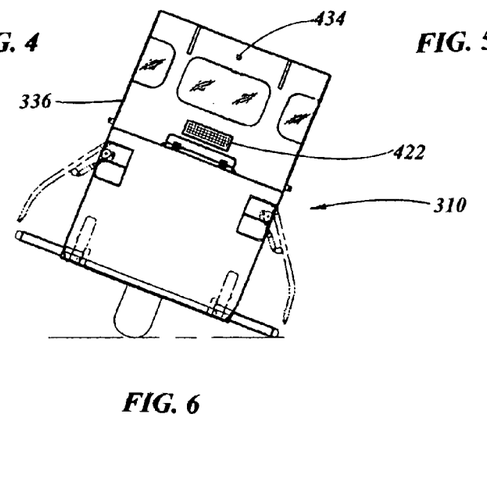
FIG. 6 is a rear view of the improved enclosed motorcycle illustrated tilted resting on the lower skid posts.

A sliding rear window screen 422, partially illustrated in FIG. 5, is actuated by a remote cable with a handle.

The top of the enclosure 336 incorporates a round vent hole 424 which is protected by a top vent hinged cover 426 which is operable with a hand knob illustrated in FIGS. 21, 22 and 23.

A passenger seat 356, depicted pictorially in FIGS. 1 and 2, consist of two seat cushions having unequal length such that they create an adequate height for stored items when erected.

An impact sensor 430 and an inflatable safety belt 432 are added to the motorcycle. The safety belt 432 inflates when a signal is sent from the impact sensor 430 at the time of a collision.

A rearview camera 434 is mounted within the enclosure 336, as shown in FIG. 5 and a monitor 436 is mounted within the driver's field of vision.

An electronic screen monitor, a cellular telephone, a music player and a radio, not shown as they are well known in the art, are accessories contained within the enclosure 336.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

ELEMENT DESIGNATION

For Convenience of the Examiner 310 improved enclosed motorcycle
320 structural frame
322 wheels
324 motor
326 handlebar assembly
328 foot brake pedal assembly
330 bench seat
332 landing wheel assembly
334 automatic control to extend wheels
336 enclosure
338 entrance doors 340 leg doors
342 metallic tubing frame
344 carbon fiber frame
346 preformed metal frame
348 gear box
350 regenerative braking
352 reverse drive
354 battery pack
356 passenger seat
358 torque arm
360 spherical rod ends (of 358)
362 first end (of 358)
364 second end (of 358)
366 steering shaft
368 steering bar shaft
369 adjustable height steering bar
370 landing wheels
372 support arm
374 take-up rod assembly
376 compression spring (of 374) and (398)
378 take-up adjustment rod
380 lock nut
382 landing wheel sensor
384 dashboard green light
386 vent window
388 vent window hinge
390 door frame
392 locking head
394 window frame
396 door lock
398 electronic logic control unit
400 motorized drive
402 worm gear (of 400)
404 connecting rod (of 400)
406 dashboard enunciator
408 vocal port
410 vocal port cover
412 lower skid posts
414 air conditioned jacket
416 heating elements (in 414)
418 air ducts (in 414)
420 water mist spray
422 sliding rear window screen
424 round vent hole
426 top vent hinged cover
428 passenger seat
430 impact sensor
432 inflatable safety belt
434 rear view camera
436 rear view camera monitor

The invention claimed is:

1. An improved enclosed motorcycle of the type having, a structural frame, a pair of tandem wheels, a motor, a handlebar assembly, a foot brake pedal, a bench seat, a pair of outrigger landing wheels, with automatic control to extend the wheels, an enclosure including a pair of entrance doors and a pair of leg doors, wherein the improvement comprises;
  an electric motor,
  said handlebar assembly employing a torque arm with spherical rod ends wherein the torque arm is connected to a steering shaft and a steering bar shaft,
  said foot brake pedal is attached rigidly to said frame,
  said bench seat is slideably attached onto said frame with a back portion of the bench seat capable of tilting,
  said landing wheels individually are mounted on a support arm which hinges on said structural frame and retained by a spring loaded take-up rod assembly,
  said entrance doors further having upper half windows each comprise a vent window hinged independently on a front edge with the hinge including a locking head secured to a window frame, and
  said leg door hinged horizontally onto said entrance doors, with a leg door mode dashboard switch permitting said leg doors to open at a predetermined speed before the motorcycle has stopped, also a dashboard enunciator operable when the leg doors are open.

2. An improved enclosed motorcycle of the type having, a structural frame, a pair of tandem wheels, an engine, a handlebar assembly, a foot brake pedal assembly, a bench seat, a pair of electrically actuated outrigger landing wheels, automatic control to extend the wheels; an enclosure including a pair of entrance doors and a pair of leg doors, wherein the improvement comprises;
  a) said structural frame is selected from the group consisting of a metallic tubing frame welded at intersecting joints, a carbon fiber frame and a preformed sheet metal frame,
  b) said engine, defined as using energy to develop mechanical power, is an electric motor coupled with a gear box, regenerative braking and a reduced speed reverse drive,
  c) said handlebar assembly employs a torque arm with spherical rod ends with the torque arm having a first end and a second end with the torque arm first end connected to a steering shaft and the torque arm second end connected to a steering bar shaft,
  d) said foot brake pedal is attached to said frame in a fixed position,
  e) said bench seat is slideably attached onto the frame permitting forward and aft movement and a back portion of the bench seat is capable of tilting,
  f) each of said landing wheels are individually mounted on a support arm which hinges on said structural frame and is retained by a spring loaded take-up rod assembly providing a smooth stable landing of the motorcycle on uneven ground surfaces,
  g) said entrance doors further having upper half windows each comprise a vent window pivoted on a hinge independently attached to a door frame with the lower end of the hinge including a locking head with triangular teeth engaging with mating teeth formed on a circular sector that is secured to a window frame, wherein a lock is provided on each door that is operable from the outside only for rescue purposes, and
  h) each leg door hinged horizontally onto each entrance door, with said enclosed motorcycle having an electronic logic control unit permitting said leg doors to open at a predetermined speed before the motorcycle has stopped allowing the driver to extend his/hers feet for stability and opens and closes with a motorized drive, a dashboard enunciator sounds when the leg doors are opening therefore alerting the driver that the leg doors are in operation.

3. The improved enclosed motorcycle as recited in claim 2 further comprising a battery pack for supplying electrical power to said motor.

4. The improved enclosed motorcycle as recited in claim 2 wherein said handlebar assembly further comprises an adjustable height steering bar.

5. The improved enclosed motorcycle as recited in claim 2 wherein said spring loaded take-up rod assembly further comprises a compression spring, an adjustment rod and a pair of lock nuts.

6. The improved enclosed motorcycle as recited in claim 2 further comprising at least one landing wheel sensor detecting said landing wheel's motion and position and a dashboard green light flashes when the landing wheels are moving and stays lit when extended.

7. The improved enclosed motorcycle as recited in claim 2 further comprising a round vocal port having a hinged clear cover within said pair of entrance door windows.

8. The improved enclosed motorcycle as recited in claim 2 wherein said leg door is controlled by a leg door drive consisting of a motorized worm gear with a screw type output shaft, a cylindrical shaped connecting rod and a compression spring.

9. The improved enclosed motorcycle as recited in claim 2 further comprising a pair of extendable lower skid posts positioned beneath said motorcycle frame near and below the center of gravity.

10. The improved enclosed motorcycle as recited in claim 2 further comprising an air condition jacket utilizing electrical power from said motorcycle with the jacket containing imbedded heating elements and air ducts along side of the heating elements for both heating and cooling.

11. The improved enclosed motorcycle as recited in claim 2 further comprising a water mist spray directed into the drivers face and hands.

12. The improved enclosed motorcycle as recited in claim 2 further comprising a sliding rear window screen actuated by a remote cable with a handle.

13. The improved enclosed motorcycle as recited in claim 2 further comprising said enclosure top having a round vent hole protected with a top vent hinged cover operable with a hand knob.

14. The improved enclosed motorcycle as recited in claim 2 further comprising a passenger seat consisting of two seat cushions having unequal length such that they create an adequate height for stored items when erected.

15. The improved enclosed motorcycle as recited in claim 2 further comprising an impact sensor and an inflatable safety belt which inflates when a signal is sent from the impact sensor at the time of a collision.

16. The improved enclosed motorcycle as recited in claim 2 further comprising a rearview camera which is mounted within said enclosure and a monitor which is mounted within a driver's field of vision.

17. The improved enclosed motorcycle as recited in claim 2 further comprising an electronic screen monitor, a cellular telephone, a music player and a radio.

* * * * *